(12) United States Patent
Hobbs (10) Patent No.: US 12,259,643 B2
(45) Date of Patent: Mar. 25, 2025

(54) CAMERA HEAD WITH INTEGRATED PCB STATOR MOTORS

(71) Applicant: Nodal Film Systems LLC, Los Angeles, CA (US)

(72) Inventor: Boyd Randolph Hobbs, Los Angeles, CA (US)

(73) Assignee: Nodal Film Systems LLC, Los Angeles, CA (US)

( * ) Notice: Subject to any disclaimer, the term of this patent is extended or adjusted under 35 U.S.C. 154(b) by 147 days.

(21) Appl. No.: 17/869,601

(22) Filed: Jul. 20, 2022

(65) Prior Publication Data

US 2024/0027882 A1  Jan. 25, 2024

(51) Int. Cl.
*G03B 17/56* (2021.01)
*H02K 3/26* (2006.01)
*H02K 21/24* (2006.01)

(52) U.S. Cl.
CPC ............ *G03B 17/561* (2013.01); *H02K 3/26* (2013.01); *H02K 21/24* (2013.01); *H02K 2203/03* (2013.01)

(58) Field of Classification Search
None
See application file for complete search history.

(56) References Cited

U.S. PATENT DOCUMENTS

| | | | |
|---|---|---|---|
| 9,673,684 B2 | 6/2017 | Shaw | |
| 9,673,688 B2 | 6/2017 | Shaw | |
| 9,800,109 B2 | 10/2017 | Shaw | |
| 9,859,763 B2 | 1/2018 | Shaw | |
| 10,170,953 B2 | 1/2019 | Shaw | |
| 10,211,694 B1 | 2/2019 | Shaw | |
| 10,256,690 B2 | 4/2019 | Shaw | |
| 11,005,322 B2 | 5/2021 | Milheim et al. | |
| 11,121,614 B2 | 9/2021 | Milheim | |
| 11,336,130 B1 | 5/2022 | Shaw et al. | |
| 11,527,933 B2 | 12/2022 | Shaw et al. | |
| 11,855,484 B2 | 12/2023 | Milheim et al. | |

(Continued)

FOREIGN PATENT DOCUMENTS

| | | | |
|---|---|---|---|
| CN | 114788252 A | * | 7/2022 |
| DE | 102015115676 A1 | * | 3/2017 |

(Continued)

OTHER PUBLICATIONS

Hed, New Concepts for PTR Functionality in Fixed Domes, Master Thesis, Division of Product Development, Department of Design Sciences Faculty of Engineering LTH, Lund University, 2016. (Year: 2016).*

(Continued)

*Primary Examiner* — Rodney E Fuller
(74) *Attorney, Agent, or Firm* — Lynch LLP; Sean Lynch (57) ABSTRACT

Camera heads having up to three axes of rotation (e.g., pan, tilt, roll). Each axis of rotation coincides with the rotational output of a PCB stator motor. PCB stator motors are used to prevent cogging and to reduce weight, while giving haptic feedback to a user that allows the camera head to mimic the physical properties of various mechanical camera heads. For example, despite being lightweight, an embodiment of the inventive subject matter can imitate the feel of a much heavier mechanical system.

20 Claims, 4 Drawing Sheets

(56) References Cited

U.S. PATENT DOCUMENTS

| | | | |
|---|---|---|---|
| 2004/0184798 | A1 | 9/2004 | Dumm |
| 2007/0053681 | A1 | 3/2007 | Arbuckle |
| 2010/0128122 | A1 | 5/2010 | Wright |
| 2014/0216023 | A1 | 8/2014 | Rabhi |
| 2014/0218603 | A1 | 8/2014 | Stone |
| 2015/0084446 | A1 | 3/2015 | Atar |
| 2017/0241589 | A1 | 8/2017 | Wang et al. |
| 2017/0317558 | A1* | 11/2017 | Steg ................. H02K 15/03 |
| 2017/0363932 | A1 | 12/2017 | Lim et al. |
| 2018/0123412 | A1* | 5/2018 | Karplus ............ H02K 1/2795 |
| 2018/0266621 | A1* | 9/2018 | Zhang ................ F16M 11/10 |
| 2018/0283601 | A1 | 10/2018 | Wei |
| 2019/0063668 | A1 | 2/2019 | Wei |
| 2019/0074747 | A1 | 3/2019 | Shukla |
| 2019/0161208 | A1* | 5/2019 | Sun .................... B64D 47/08 |
| 2020/0014316 | A1 | 1/2020 | Hobbs |
| 2020/0116195 | A1 | 4/2020 | Chen et al. |
| 2020/0145577 | A1 | 5/2020 | Enke et al. |
| 2021/0135549 | A1 | 5/2021 | Lee et al. |
| 2021/0218304 | A1 | 7/2021 | Schuler et al. |
| 2021/0387580 | A1 | 12/2021 | Canones Bonham |
| 2022/0357639 | A1* | 11/2022 | Rubens ............... G03B 17/563 |
| 2023/0042319 | A1* | 2/2023 | Brahmavar .......... H02K 1/2713 |
| 2023/0216363 | A1 | 7/2023 | Hobbs |
| 2023/0353000 | A1* | 11/2023 | Anvari ................ H02K 9/19 |

FOREIGN PATENT DOCUMENTS

| | | | | |
|---|---|---|---|---|
| EP | 3035076 B1 | * | 8/2020 | ............. G01C 1/02 |
| WO | WO-2015039047 A1 | * | 3/2015 | ............ H02K 33/16 |
| WO | WO-2018064831 A1 | * | 4/2018 | ........... B64C 39/024 |
| WO | 2018157591 A1 | | 9/2018 | |
| WO | WO-2022141451 A1 | * | 7/2022 | |

OTHER PUBLICATIONS

Welcome to PCBMotor Optical World, PCBMotor, https://pcbmotor.com/wp-content/uploads/2018/05/PCBMotor-Optical-world-_-1.8 pdf, dated 2018. (Year: 2018).* https://pcbstator.com/news/what-pcb-stator-motor/#:~:text=PCB%20Stators%20replace%20the%20bulky; What is a PCB Stator Motor?; downloaded Oct. 2, 2024.

Guedes-Pinto, Paulo, https://spectrum.ieee.org/axial-flux; This Axial-Flux Motor With a PCB Stator is Ripe for an Electrified World—IEEE Spectrum; Mar. 26, 2022; downloaded Oct. 2, 2024.

https://www.ewmfg.com/pcb-stator-technology/; PCB Stator Technology | East West Manufacturing; downloaded Oct. 2, 2024.

https://goinfinitum.com/endurance-and-lifetime-pcb-stators/; Revolutionize Your Motors; downloaded Oct. 2, 2024.

* cited by examiner

CAMERA HEAD WITH INTEGRATED PCB STATOR MOTORS

FIELD OF THE INVENTION

The field of the invention is motor controlled camera equipment.

BACKGROUND

The background description includes information that may be useful in understanding the present invention. It is not an admission that any of the information provided in this application is prior art or relevant to the presently claimed invention, or that any publication specifically or implicitly referenced is prior art.

Cinematography is constantly evolving with new technology, and as technology continues develop, some staples of the art can be lost. For example, camera operators in the past have used heavy equipment. This is in part because the only equipment available was itself heavy (e.g., heavier cameras, heavier camera heads, etc.), but there are advantages to using heavy equipment.

Heavy equipment can help to create smooth movements. When a camera operator pans, tilts, or rolls a camera mounted to a camera head, the mass of that mechanical system contributes to smooth movements. But as technology improves, cameras and associated equipment have gotten lighter. There are some important advantages to a lighter system, including increase portability, which makes it easier for film makers to transport equipment. But with the decreased mass, smooth movements can be more difficult to achieve.

Historically, cinematography has used a range of devices to control the rotation of a camera. Commonly, a two-axis pan/tilt tripod head is used to smoothly pan and tilt a camera. These systems conventionally only have a friction adjustment or a counterbalance system based on a tripod's pivot point and a payload's center of gravity. These traditional systems are operated directly by a camera operator, and they fail to allow the operator to make adjustments to certain physical properties of the system, such as inertia of the payload.

Thus, there is still a need for lightweight camera equipment that can nevertheless keep the feel of a heavier system. It has yet to be appreciated that such a system can be created electromechanically and that it can be configurable to mimic the feel of any type of mechanical system.

SUMMARY OF THE INVENTION

The present invention provides apparatuses, systems, and methods directed to motorized camera heads that are configured to give haptic feedback to users. In one aspect of the inventive subject matter, a camera head is contemplated, the camera head comprising: a roll motor comprising a roll motor printed circuit board (PCB) stator; a tilt motor comprising a tilt motor PCB stator; a pan motor comprising a pan motor PCB stator; where the roll motor is annular having a through hole, and a camera mount is coupled thereto such that a mounted camera can be at least partially disposed in the through hole; where the roll motor couples with the tilt motor by a roll motor mount; and where the tilt motor couples with the pan motor by a tilt motor mount.

In some embodiments, the roll motor and the tilt motor can be annular. The roll motor PCB stator can be a partial stator, and when formed as a partial stator, the roll motor PCB stator can be shaped according to an arc segment. In some embodiments, the camera mount can additionally have a set of mounting rods. The roll motor can include an annular roll rotor having an interior facing surface, and the camera mount can couple with that interior facing surface.

In another aspect of the inventive subject matter, another camera head is contemplated, the camera head comprising: a first motor comprising a first motor PCB stator; a second motor comprising a second motor PCB stator; where the first motor couples with the second motor by a first motor mount; where the first motor is configured to cause rotation about a first axis, and the second motor is configured to cause rotation about a second axis; and where the first axis is orthogonal to the second axis.

In some embodiments, the first motor and the second motor can be annular. In some embodiments, a camera mount couples with the first motor and in some embodiments, a camera mount couples with the second motor.

In some embodiments, another camera head is contemplated, the camera head comprising: a first motor comprising a first motor printed circuit board (PCB) stator, where the first motor PCB stator is a partial stator; a second motor comprising a second motor PCB stator; a third motor comprising a third motor PCB stator; where the first motor couples with the second motor by a first motor mount; where the second motor couples with the third motor by a second motor mount; where the first motor is configured to cause rotation about a first axis, the second motor is configured to cause rotation about a second axis, and the third motor is configured to cause rotation about a third axis; and where the first axis is orthogonal to the second axis and the second axis is orthogonal to the third axis. In some embodiments, the first motor, the second motor, and the third motor can be annular.

One should appreciate that the disclosed subject matter provides many advantageous technical effects including lightweight camera heads that reproduce the feeling of heavier mechanical systems via use of PCB stator motors in association with one or more motor controllers.

Various objects, features, aspects, and advantages of the inventive subject matter will become more apparent from the following detailed description of preferred embodiments, along with the accompanying drawing figures in which like numerals represent like components.

DETAILED DESCRIPTION

The following discussion provides example embodiments of the inventive subject matter. Although each embodiment represents a single combination of inventive elements, the inventive subject matter is considered to include all possible combinations of the disclosed elements. Thus, if one embodiment comprises elements A, B, and C, and a second embodiment comprises elements B and D, then the inventive subject matter is also considered to include other remaining combinations of A, B, C, or D, even if not explicitly disclosed.

As used in the description in this application and throughout the claims that follow, the meaning of "a," "an," and "the" includes plural reference unless the context clearly dictates otherwise. Also, as used in the description in this application, the meaning of "in" includes "in" and "on" unless the context clearly dictates otherwise.

Also, as used in this application, and unless the context dictates otherwise, the term "coupled to" is intended to include both direct coupling (in which two elements that are coupled to each other contact each other) and indirect coupling (in which at least one additional element is located between the two elements). Therefore, the terms "coupled to" and "coupled with" are used synonymously.

It should be noted that any language directed to a computer or computing device should be read to include any suitable combination of computing devices, including servers, interfaces, systems, databases, agents, peers, Engines, controllers, or other types of computing devices operating individually or collectively. One should appreciate the computing devices comprise a processor configured to execute software instructions stored on a tangible, non-transitory computer readable storage medium (e.g., hard drive, solid state drive, RAM, flash, ROM, etc.). The software instructions preferably configure the computing device to provide the roles, responsibilities, or other functionality as discussed below with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network. The following description includes information that may be useful in understanding the present invention. It is not an admission that any of the information provided in this application is prior art or relevant to the presently claimed invention, or that any publication specifically or implicitly referenced is prior art.

Embodiments of the inventive subject matter are directed to camera control systems that facilitate manual interaction with a camera while simultaneously incorporating haptic feedback and introducing adjustable mechanical properties via electromechanical systems. In some embodiments, a camera is mounted to a control system, while in other embodiments a handle can be mounted to a control system to facilitate control of a head having a mounted camera. Control systems of the inventive subject matter incorporate printed circuit board (PCB) stator motors, which are instrumental in facilitating desirable form factors and also in eliminating motor cogging, a side effect of other motor technologies that can negatively impact user experience.

The stators of PCB stator motors have no slotted iron core. Thus, cogging torque—which is defined as the interaction of the permanent magnets on the rotor with a slotted iron stator structure in a no-load condition—is zero. Cogging torque can lead to torque ripple as well as speed ripple, which impacts performance and feel. To eliminate cogging in any other type of motor would dramatically increase mass and size, which is not ideal and eliminates the advantage of low weight that comes from embodiments of the inventive subject matter. Traditional electric motors are unable to fit the specific needs of embodiments of the inventive subject matter where, e.g., cogging must be eliminated.

Haptic feedback contemplated in this application includes using motors to give a control system a heavier or lighter feel than the actual mechanical system. In addition to mass, other physical attributes of a control system can be adjusted such as friction, rotational inertia, and any other physical quality that the motors of systems described in this application could affect. Systems of the inventive subject matter allow for a camera operator to have the experience of operating, e.g., a heavy, purely mechanical system without all the mass and parts associated with such a system.

Increasingly, "remote heads" are used for panning, tilting, and rolling cameras when the operator cannot be physically next to the camera or would like to employ gyro stabilization to the camera. Electromechanical heads of the inventive subject matter can facilitate remote camera head control while nevertheless giving all the advantages of a lightweight system that uses PCT stator motors (e.g., no cogging) while providing haptic feedback to a camera operator working remotely. Moreover, systems of the inventive subject matter can be configured as all-in-one systems, allowing for panning, tilting, and rolling all in a single lightweight and small package.

Figures 1, 2:
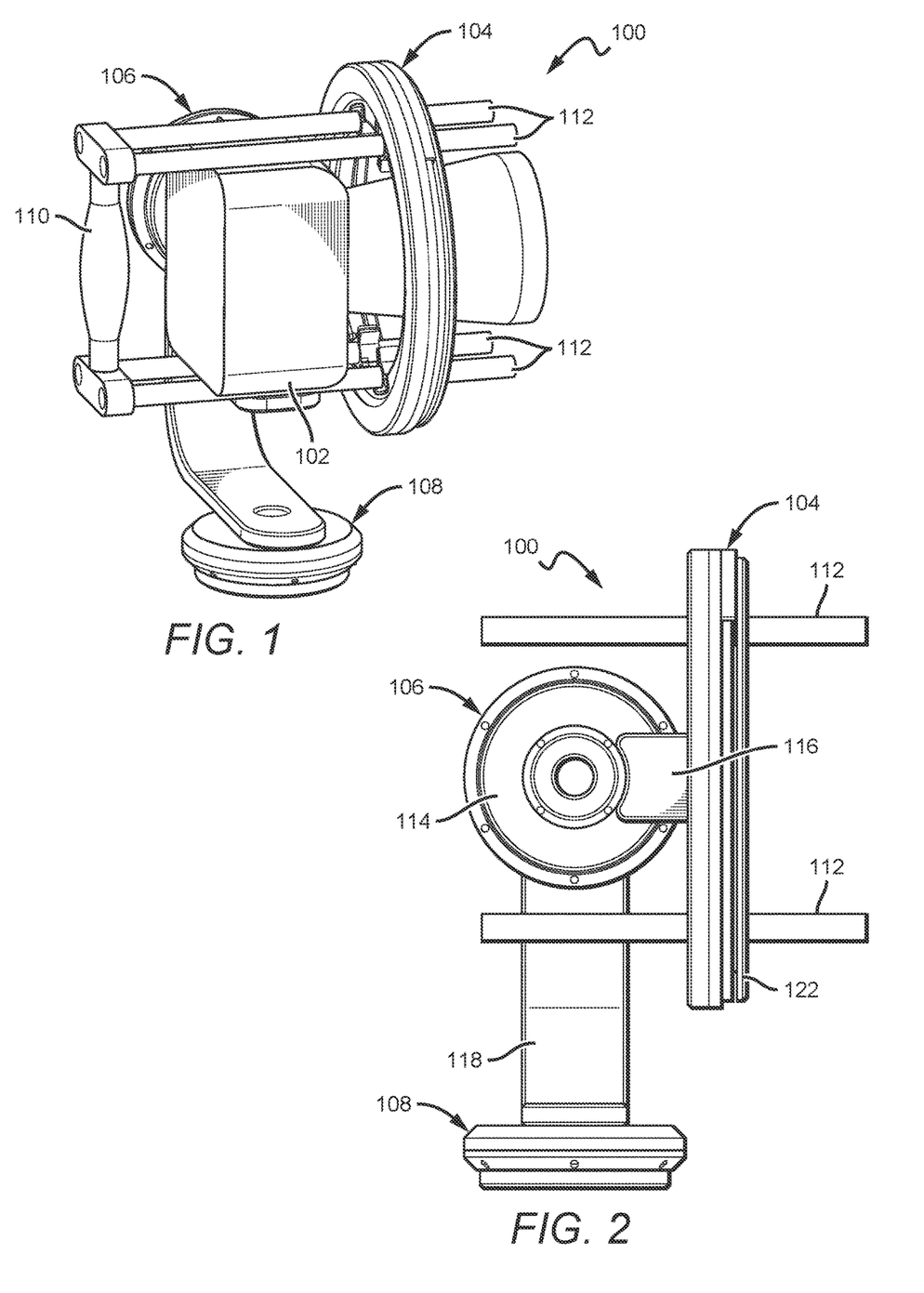
FIG. 1 is a camera head of the inventive subject matter with a mounted camera.
FIG. 2 is a side view thereof.

FIG. 1 shows control system 100 having a camera 102 mounted therein. Control system 100 features three axes of control, including roll, tilt, and pan. Thus, control system 100 incorporates roll motor 104, tilt motor 106, and pan motor 108. Because each of these motors is configured as a PCB stator motor, they are thin in comparison to traditional electric motors. PCB stator motors also feature annular rotors (e.g., the rotating output portion of the motor) instead of rotors formed as a shaft, which makes configurations described in this application possible. Pan motor 108 and tilt motor 106 are oriented such that their axes of rotation are orthogonal to one another (and tilt motor 106 and roll motor 104 are oriented such that their axes of rotation are orthogonal to one another), and roll motor 104 is configured such that camera 102 can be disposed as least partially inside a hole formed by roll motor 104. This configuration ensures the lens of camera 102 is at the center of the axis of rotation for roll motor 104, which can improve quality of a shot while recording.

Although the configuration described in this application shows the roll motor coupled to the tilt motor which is coupled to the pan motor, it is contemplated that the roll motor can be coupled with the pan motor which can then be coupled with the tilt motor without deviating from the inventive subject matter. Moreover, orienting an embodiment of the inventive subject matter differently while also changing how a camera mounts thereto can bring about repurposing of the motors (e.g., the pan motor can become a tilt motor, etc.). Such reorientations or reconfigurations are expressly contemplated in this patent application.

Behind camera 102 is a handle that couples with a plurality of mounting rods 112 that hold camera 102 in place. By including a handle, a camera operator can directly manipulate the orientation of camera 102, and, while manipulating the camera's orientation, roll motor 104, tilt motor 106, and pan motor 108 can provide haptic feedback to the operator.

FIG. 2 shows control system 100 from a side view (without camera 102 or handle 110), showing tilt motor 106 head-on. From this view, tilt motor 106 can be seen as having an annular configuration. Tilt rotor 114 is therefore an annular component, and a roll motor mount 116 is coupled with tilt rotor 114 so that a rotation of tilt motor 106 causes the roll motor 104 (and thus a camera) to tilt. Tilt motor 106 is coupled with pan motor 108 by tilt motor mount 118 so that a rotation of pan motor 108 causes tilt motor 106 (and thus roll motor 104 and a camera) to pan.

Figure 3:
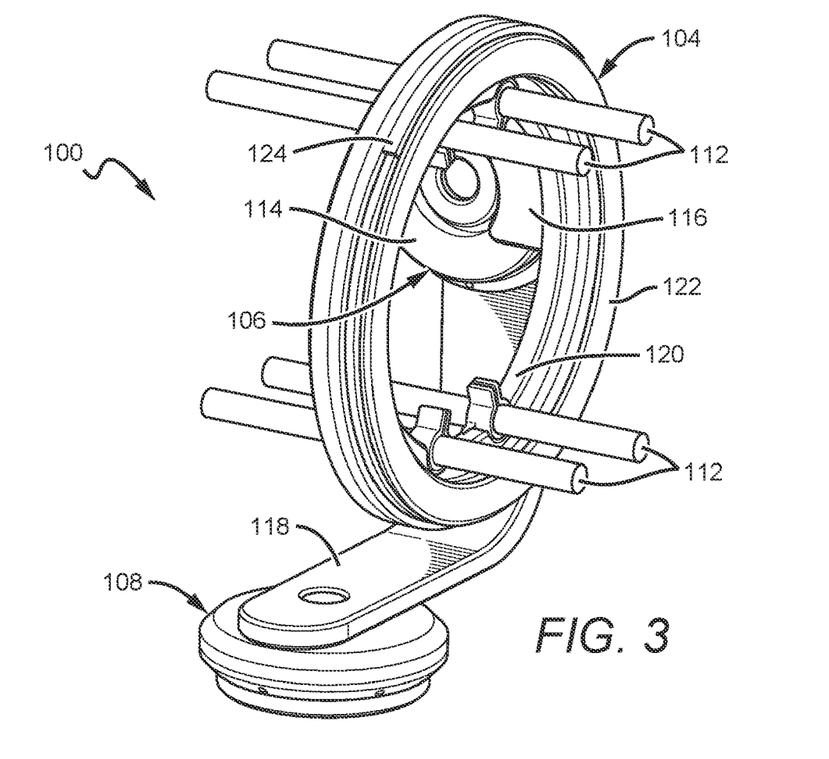
FIG. 3 is an isometric view thereof.

FIG. 3 shows control system 100 from a different angle to show the front of roll motor 104. Roll motor 104 includes only a partial PCB stator (roll stator 124). In some embodiments, a full PCB stator (e.g., a PCB stator extending the full circumference of the rotor) can be implemented. PCB stator motors do not require a full stator and it can be advantageous to include a partial PCB stator, e.g., to reduce energy consumption or when less torque is required than a full PCB stator could produce. The partial PCB stator can be formed according to an arc that is a segment of a circle (e.g., greater than 0 radians but less then 2π radians).

From this view, mounting ring 120 is shown coupled with roll rotor 122. Mounting ring 120 includes a plurality of collars that can be tightened to hold mounting rods 112 in place relative to roll rotor 122. Thus, when a camera is coupled with mounting rods 112, a camera mounted to the system can be rolled by roll motor 104.

Figure 4:
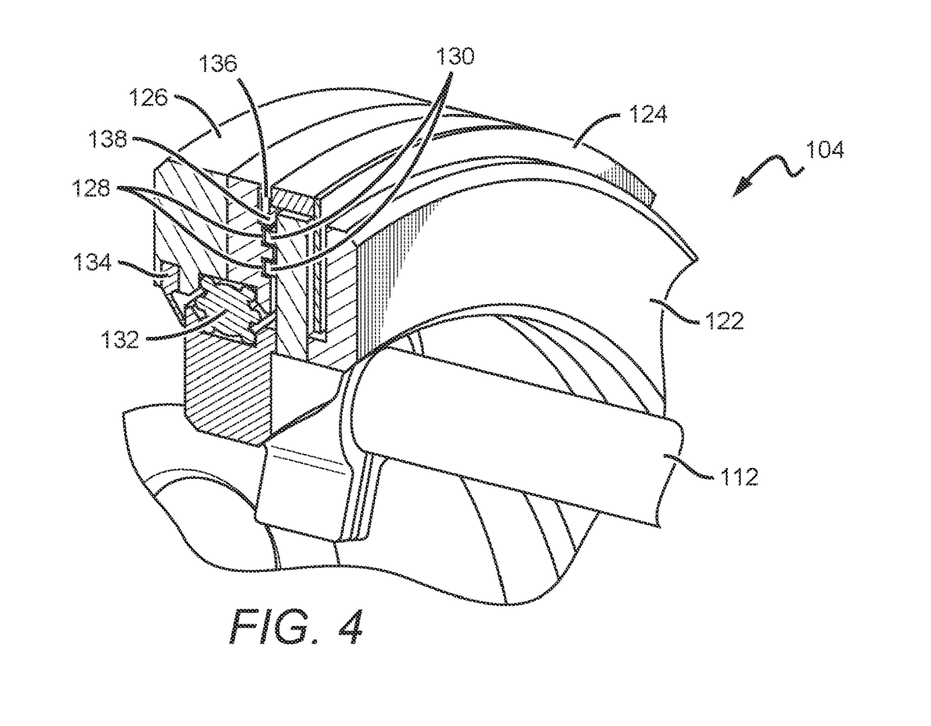
FIG. 4 is a cutaway view of a roll motor.

FIG. 4 shows a closer, cutaway view of roll motor 104. From this view, roll stator 124 can be seen extending into a slot on roll rotor 122. Roll rotor 122 interacts with roll motor body 126 in several areas. Roll motor body 126 features a set of grooves 128 and a set of tongues 130 that are sized and dimensioned to interact such that roll rotor 122 does not shift relative to roll motor body 126 (e.g., roll rotor's movement relative to roll motor body should be rotational about a center axis shared by both components).

A roll motor bearing 132 is shown positioned between roll motor body 126 and roll rotor 122. Although only one roll motor bearing is shown, the space that roll motor bearing 132 exists in extends radially through roll motor 104, and multiple roll motor bearings can be disposed throughout. Dust shield 134 is also visible, which prevents detritus from entering the space where roll motor bearings are disposed. Dust shield 134 can be made from, e.g., a flexible material such as rubber, plastic, or the like. Dust shield 134 improves device performance and longevity by preventing dust from entering the bearing space. Dust shields can be incorporated into any of the motors described in this application.

Roll motor 104 additionally includes an integrated optical rotation sensor 136 which is fixed to an interior surface of roll motor body 126 such that it faces an optical track 138 disposed on a portion of roll rotor 122 that is located near the set of tongues 130. Optical rotation sensor 136 thus measures rotation of roll rotor 122, which can be used to measure angular position, angular velocity, angular acceleration, and any other metric that can be derived using time and angular position. These measured and derived physics parameters can be used as feedback in a control system, which will be described below in more detail. Although rotation sensors in this application are described as being optical, any type of rotation detector can be implemented without deviating from the inventive subject matter.

Figure 5:
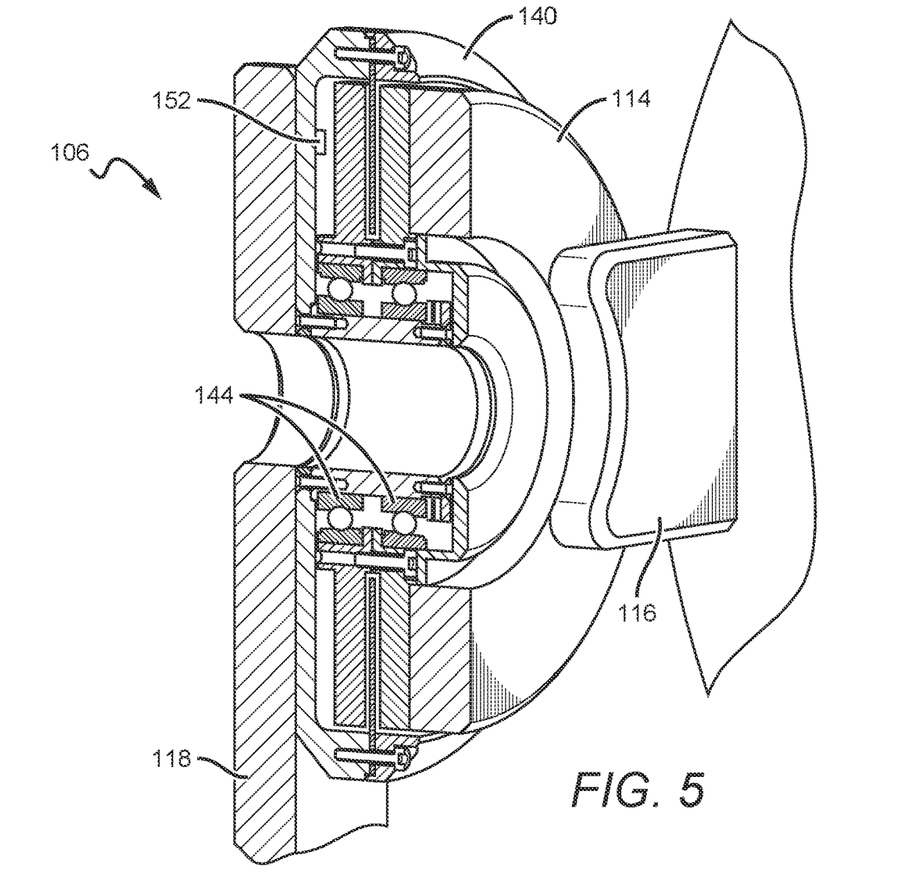
FIG. 5 is a cutaway view of a tilt motor.

FIG. 5 shows a closer, cutaway view of tilt motor 106. Tilt motor 106 features an annular tilt stator 140. Tilt stator 140 is disposed within a slot such that it can cause tilt rotor 114 to turn. Roll motor mount 116 is coupled to tilt rotor 114. Tilt stator 140 couples with an outer portion of tilt motor body 142. By coupling with an outer portion, tilt stator 140 can extend into a slot created by tilt rotor 114. Tilt motor 106 additionally include tilt motor bearings 144 that act as an interface between tilt motor body 142 and tilt rotor 114. As shown in FIG. 5, tilt motor bearings 144 are both ball bearings, though in some embodiments, roller bearings, magnetic bearings, fluid bearings, and plain bearings can also be used without deviating from the inventive subject matter. Tilt motor 106 is coupled to tilt motor mount 118, and tilt motor mount 118 couples with pan motor 108, as described below.

As with roll motor 104, tilt motor 106 features tilt rotation detector 152, which can facilitate measuring and deriving a variety of physics parameters related to tilt motor 106. Opposite roll rotation detector 152 is an optical track disposed on an internal surface of tilt rotor 122. Physics parameters can be used by, e.g., a computing device and motor controller to bring about desirable effects described below in more detail.

Figure 6:
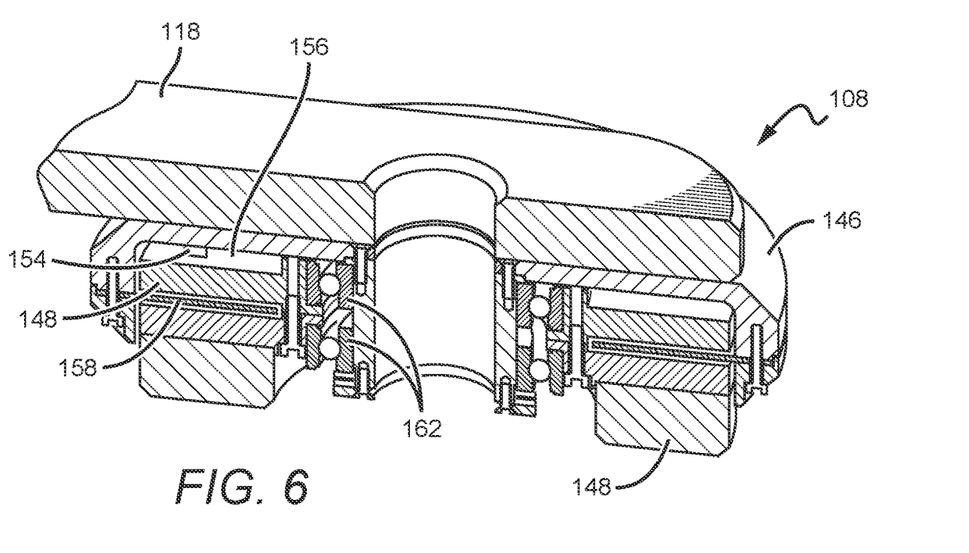
FIG. 6 is a cutaway view of a pan motor.

FIG. 6 shows a closer, cutaway view of pan motor 108. Pan motor 108 is configured similarly to tilt motor 106. It includes pan motor body 146 and pan rotor 148. Pan motor bearings 162 are disposed between pan motor body 146 and pan motor rotor 148 and are configured to reduce friction between those components. Pan rotor 148 is caused to turn by pan motor stator 158. As shown in FIG. 6, pan motor body 146 couples with tilt motor mount 118, which leaves pan rotor 148 facing downward. Pan rotor 148 can thus couple to, e.g., a stationary surface, a tripod, a camera crane, camera dolly, tracking vehicle, body-mounted vest, stabilization arm, etc.

Because pan motor 108 is configured similarly to tilt motor 106, it features an integrated pan rotation detector 154, which can facilitate measuring and deriving a variety of physics parameters related to pan motor 108. Opposite pan rotation detector 154 is an optical track 156 disposed on an internal surface of pan rotor 148. Physics parameters can be used by, e.g., a computing device and motor controller to bring about desirable effects described below in more detail.

Figures 7, 8, 9:
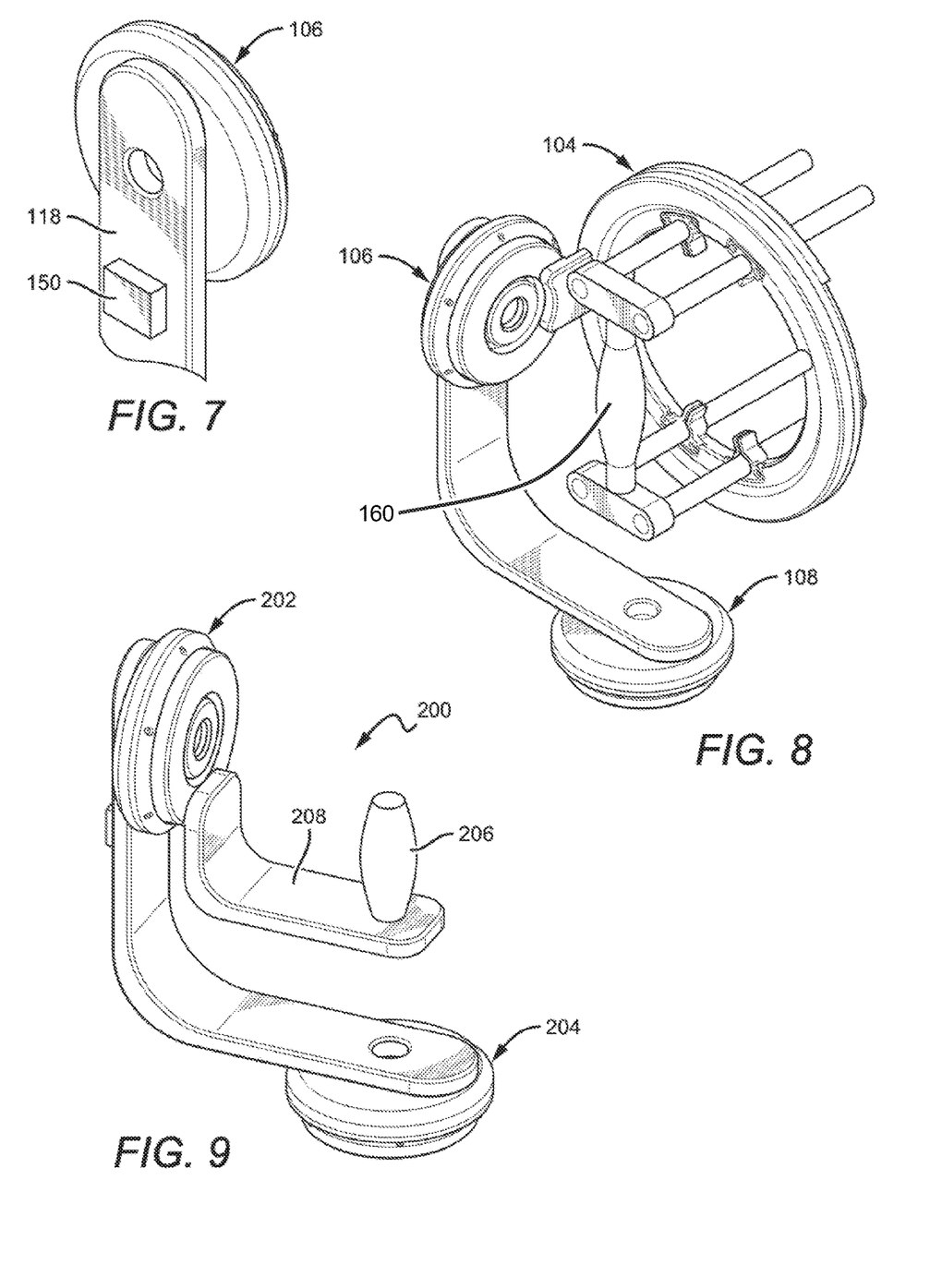
FIG. 7 is an isometric view thereof showing a motor controller.
FIG. 8 is an isometric view thereof showing a handle without a camera.
FIG. 9 is an isometric view of an embodiment having two control axes and a handle.

FIG. 7 shows an outer surface of tilt motor mount 118 with controller 150 coupled thereto. Controller 150 can include electronics sufficient to drive and control roll motor 104, tilt motor 106, and pan motor 108. In some embodiments, motor controller 150 comprises a microprocessor that is additional capable of processing sensor information from all rotation detectors in a system of the inventive subject matter.

All these components together create a system that can give a camera operator the feel that a camera system has a heavy, mechanical feel while in reality it is lightweight and easy to transport. Systems of the inventive subject matter are intended to be manipulated directly by a camera operator.

Each motor in a system of the inventive subject matter operates according to a closed-loop control system, where information (e.g., physics parameters, as described above) from a motor's rotation detector is used in a feedback loop. Controller 150 can include, for example, a microprocessor, a computing device, a motor controller, a solid-state controller comprising prefabricated IC components, or any combination thereof implemented via hardware, software, or some combination thereof. Controller 150 is electronically and informationally coupled with each motor and rotation detector. In one use example, as a camera operator pans camera 102, pan motor 108 undergoes an angular position change. Pan motor's rotation detector collects angular position data and sends that to controller 150, and controller 150 uses that information to drive the pan motor 108 to change one or more of the system's physical qualities (e.g., mass, rotational inertia, friction, etc.).

Controller 150 thus interprets information from pan motor's rotation detector to determine information about the movement of pan motor 108 (e.g., angular position, angular velocity, angular acceleration, or a change in any of those terms). Controller 150 then sends signals to pan motor 108 to drive pan motor 108 (e.g., directly or via a motor driver circuit) to bring about the effect of simulated physical qualities for the system when it pans. For example, controller 150 can drive pan motor 108 in the opposite direction of the pan motor's angular position change to make it feel like control system 100 is heavier while panning than it actually is. For example, if pan motor 108 undergoes an angular acceleration, its rotation detector sends signals to controller 150 sufficient for controller 150 to determine pan motor's angular position change over time so that angular acceleration can be deduced, and controller 150 then tells pan motor 108 to "brake" (e.g., apply torque in a direction opposite of the pan motor's angular acceleration—in this case, applying a negative angular acceleration) resisting the pan motor's positive angular acceleration, giving control system 100 a simulated behavior and feel of a heavier mechanical system. When pan motor 108 is turning, controller 150 will cause control system 100 to continue to pan as if it has a higher rotational inertia than it actually has.

Although the example above relates to pan motor 108, roll motor 104 and tilt motor 106 are configured to function according to the same principles. Each motor can be configured to create different apparent physical properties.

FIG. 8 shows another possible configuration of control system 100. Instead of having a camera mounted, there is instead handle 160, which can be used to manipulate control system 100. This configuration facilitates control of a head with a camera attached while still maintaining the feel of a traditional, heavy mechanical system. The camera operator can then control the head with the same feel as if it were a directly controlled camera system.

FIG. 9 shows 2-axis control system 200, which is an alternative embodiment of control system 100. 2-axis control system 200 does not have a roll motor, instead featuring only tilt and pan motors. Tilt motor 202 is configured according to the description of tilt motor 106, above, and pan motor 204 is configured according to the description of pan motor 108. 2-axis control system 200 additionally features handle 206 to facilitate manual manipulation by an operator. Handle 206 couples with tilt motor by handle bracket 208.

An advantage of control systems of the inventive subject matter is that camera operators can configure a system to mimic whatever existing system they like. For example, if a camera operator is accustomed to using a specific gear setup, a control system of the inventive subject matter can mimic that system. In some embodiments, an operator can select a specific camera and a specific rig, and the control system can then mimic that setup. Operators can similarly configure a control system to function as a fictional system having custom physical properties (e.g., custom mass and friction).

Thus, specific systems and methods directed to electromechanical camera heads have been disclosed. It should be apparent to those skilled in the art that many more modifications besides those already described are possible without departing from the inventive concepts in this application. The inventive subject matter, therefore, is not to be restricted except in the spirit of the disclosure. Moreover, in interpreting the disclosure all terms should be interpreted in the broadest possible manner consistent with the context. In particular the terms "comprises" and "comprising" should be interpreted as referring to the elements, components, or steps in a non-exclusive manner, indicating that the referenced elements, components, or steps can be present, or utilized, or combined with other elements, components, or steps that are not expressly referenced.

What is claimed is:

1. A camera head, comprising:
   a roll motor comprising a roll motor printed circuit board (PCB) stator;
   a tilt motor comprising a tilt motor PCB stator;
   a pan motor comprising a pan motor PCB stator;
   wherein the roll motor is annular having a through hole, and a camera mount is coupled thereto such that a mounted camera can be at least partially disposed in the through hole;
   wherein the roll motor couples with the tilt motor by a roll motor mount; and
   wherein the tilt motor couples with the pan motor by a tilt motor mount.

2. The camera head of claim 1, wherein the roll motor is annular.

3. The camera head of claim 1, wherein the tilt motor is annular.

4. The camera head of claim 1, wherein the roll motor PCB stator is a partial stator.

5. The camera head of claim 4, wherein the roll motor PCB stator is shaped according to an arc segment.

6. The camera head of claim 1, wherein the camera mount comprises a set of mounting rods.

7. The camera head of claim 1, wherein the roll motor comprises an annular roll rotor having an interior facing surface.

8. The camera head of claim 7, wherein the camera mount couples with the interior facing surface.

9. The camera head of claim 1, further comprising a motor controller configured to cause the roll motor, the tilt motor, and the pan motor to provide haptic feedback.

10. A camera head, comprising:
    a first motor comprising a first motor PCB stator;
    a second motor comprising a second motor PCB stator;
    wherein the first motor couples with the second motor by a first motor mount;
    wherein the first motor is configured to cause rotation about a first axis, and the second motor is configured to cause rotation about a second axis; and
    wherein the first axis is orthogonal to the second axis.

11. The camera head of claim 10, wherein the first motor is annular.

12. The camera head of claim 10, wherein the second motor is annular.

13. The camera head of claim 10, wherein a camera mount couples with the first motor.

14. The camera head of claim 10, wherein a camera mount couples with the second motor.

15. The camera head of claim 10, further comprising a motor controller configured to cause the first motor and the second motor to provide haptic feedback.

16. A camera head, comprising:
    a first motor comprising a first motor printed circuit board (PCB) stator;
    wherein the first motor PCB stator is a partial stator;
    a second motor comprising a second motor PCB stator;
    a third motor comprising a third motor PCB stator;
    wherein the first motor couples with the second motor by a first motor mount;
    wherein the second motor couples with the third motor by a second motor mount;
    wherein the first motor is configured to cause rotation about a first axis, the second motor is configured to cause rotation about a second axis, and the third motor is configured to cause rotation about a third axis; and wherein the first axis is orthogonal to the second axis, and wherein the second axis is orthogonal to the third axis.

17. The camera head of claim 16, wherein the first motor is annular.

18. The camera head of claim 16, wherein the second motor is annular.

19. The camera head of claim 16, wherein the third motor is annular.

20. The camera head of claim 16, further comprising a motor controller configured to cause the first motor, the second motor, and the third motor to provide haptic feedback.

* * * * *